(12) United States Patent
Färber et al.

(10) Patent No.: US 12,030,247 B2
(45) Date of Patent: Jul. 9, 2024

(54) MATERIAL EJECTION SYSTEM, PRINT HEAD, 3D PRINTER, AND METHOD FOR MATERIAL EJECTION

(71) Applicant: QUANTICA GMBH, Berlin (DE)

(72) Inventors: Ludwig Färber, Leipzig (DE); Ben Hartkopp, Berlin (DE)

(73) Assignee: QUANTICA GMBH, Berlin (DE)

( * ) Notice: Subject to any disclaimer, the term of this patent is extended or adjusted under 35 U.S.C. 154(b) by 146 days.

(21) Appl. No.: 17/777,940

(22) PCT Filed: Nov. 10, 2020

(86) PCT No.: PCT/EP2020/081636
§ 371 (c)(1),
(2) Date: May 18, 2022

(87) PCT Pub. No.: WO2021/099185
PCT Pub. Date: May 27, 2021

(65) Prior Publication Data
US 2023/0339176 A1  Oct. 26, 2023

(30) Foreign Application Priority Data
Nov. 19, 2019  (EP) .................................... 19210067

(51) Int. Cl.
*B41J 2/14* (2006.01)
*B29C 64/112* (2017.01)
(Continued)

(52) U.S. Cl.
CPC .......... *B29C 64/209* (2017.08); *B29C 64/112* (2017.08); *B29C 64/25* (2017.08);
(Continued)

(58) Field of Classification Search
CPC ... B29C 64/209; B29C 64/112; B29C 64/165; B29C 64/25; B29C 64/393;
(Continued)

(56) References Cited

U.S. PATENT DOCUMENTS

2004/0263547 A1* 12/2004 Sugahara ............. B41J 2/04526
347/9
2008/0018684 A1* 1/2008 Nagashima .......... B41J 2/17563
347/70
2008/0266365 A1 10/2008 Yoo et al.

FOREIGN PATENT DOCUMENTS

EP        0600743 A2    6/1994
EP        0993951 A2    4/2000
(Continued)

OTHER PUBLICATIONS

International Search Report for International Application No. PCT/EP2020/081636, mailed Feb. 10, 2021 (2 pages).
(Continued)

*Primary Examiner* — Yaovi M Ameh
(74) *Attorney, Agent, or Firm* — KAGAN BINDER, PLLC

(57) ABSTRACT

A material ejection system, a print head, a 3D printer, and a method for material ejection is provided. The material ejection system comprises: a housing; a plate provided in the housing and dividing the housing in an upper space and a lower space, wherein the lower space is configured to hold a material for ejection; a controller unit; one or more material ejection units each comprising: a membrane formed by two essentially parallel slits in the plate, a first electrode provided above the membrane in the upper space, a piezoelectric element provided on the first electrode, a second electrode provided on the piezoelectric element, wherein the first and second electrodes are each electrically connected to the controller unit for providing a voltage to the piezoelec-
(Continued)

tric element, and an extension member provided underneath the membrane extending into the lower space. The material ejection system further comprises nozzle plate provided at a bottom end of the housing and comprising one or more nozzle openings formed at positions corresponding to a respective lower portion of a respective extension member and provided at a predetermined distance from said lower portion in the lower space.

20 Claims, 5 Drawing Sheets

(51) Int. Cl.
*B29C 64/209* (2017.01)
*B29C 64/25* (2017.01)
*B29C 64/393* (2017.01)
*B33Y 30/00* (2015.01)
B29C 64/165 (2017.01)
B33Y 10/00 (2015.01)

(52) U.S. Cl.
CPC ......... *B29C 64/393* (2017.08); *B41J 2/14201* (2013.01); *B29C 64/165* (2017.08); *B33Y 10/00* (2014.12); *B33Y 30/00* (2014.12); *B41J 2002/14362* (2013.01); *B41J 2002/14491* (2013.01); *B41J 2202/05* (2013.01)

(58) Field of Classification Search
CPC .......... B41J 2/14201; B41J 2002/14491; B41J 2002/14362; B41J 2202/05; B33Y 10/00; B33Y 30/00

See application file for complete search history.

(56) References Cited

FOREIGN PATENT DOCUMENTS

| | | | | |
|---|---|---|---|---|
| EP | 2842753 A1 | * | 3/2015 | .......... B41J 2/14201 |
| JP | 2010105184 A | * | 5/2010 | .............. B41J 2/045 |
| JP | 2010105184 A | | 5/2010 | |

OTHER PUBLICATIONS

E-Space net English Abstract and Translation for JP 2010105184 A.

* cited by examiner

MATERIAL EJECTION SYSTEM, PRINT HEAD, 3D PRINTER, AND METHOD FOR MATERIAL EJECTION

CROSS-REFERENCE TO RELATED APPLICATIONS

This application claims priority to International Application No. PCT/EP2020/081636, filed Nov. 10, 2020 and titled "MATERIAL EJECTION SYSTEM, PRINT HEAD, 3D PRINTER, AND METHOD FOR MATERIAL EJECTION," which in turn claims priority from a European Patent Application having Ser. No. 19/210,067.5, filed Nov. 19, 2019, both of which are incorporated herein by reference in their entireties.

The invention relates a print head for a 3D printer. In particular, the invention relates to a material ejection system, a print head, a 3D printer, and a method for material ejection.

A 3D printer of the inkjet-type comprises an actuator unit and a print head. The actuator unit moves the print head in a three dimensional space. The print head comprises a material ejection system configured to eject a print material. The print material is ejected from the ejection system to successively form layers of a three dimensional object. Optionally the ejected material is hardened when forming the three dimensional object.

Material ejection systems may comprise a piezoelectric actuator system for ejecting a droplet of print material. The piezoelectric actuator system commonly comprises a plurality of stacked piezoelectric elements. However, such stacked piezoelectric elements are complex to manufacture, require complex drive electronics, and are structurally sensitive.

EP 1 631 439 B1 relates to an apparatus for producing an object by sequentially forming thin layers of a construction material one on top of the other responsive to data defining the object, the apparatus comprises: a plurality of printing heads each having a surface formed with a plurality of output orifices and controllable to dispense the construction material through each orifice independently of the other orifices; a shuttle to which the printing heads are mounted; a support surface; and a controller adapted to control the shuttle to move back and forth over the support surface and as the shuttle moves to control the printing heads to dispense the construction material through each of their respective orifices responsive to the data to form a first layer on the support surface and thereafter, sequentially the other layers; wherein each printing head is dismountable from the shuttle and replaceable independently of the other printing heads.

US 2003/088969 A1 relates to a liquid droplet ejection device, which includes a number of liquid ejection nozzles, a liquid supply layer including porous material, with the liquid supply layer featuring holes related to the nozzles, and a number of transducers related to the holes for ejecting liquid droplets out through the nozzles.

In view of the above it is an object to provide an improved material ejection system, a print head, a 3D printer, and a method for material ejection. The above object is achieved by the subject-matter of the independent claims. The dependent claims relate to further aspects of the invention.

According to the invention there is provided a material ejection system comprising: a housing; a plate provided in the housing and dividing the housing in an upper space and a lower space, wherein the lower space is configured to hold a material for ejection; a controller unit; one or more material ejection units each comprising: a membrane formed by two essentially parallel slits in the plate, a first electrode provided above the membrane in the upper space, a piezoelectric element provided on the first electrode, a second electrode provided on the piezoelectric element, wherein the first and second electrodes are each electrically connected to the controller unit for providing a voltage to the piezoelectric element, and an extension member provided underneath the membrane extending into the lower space. The material ejection system further comprises a nozzle plate provided at a bottom end of the housing and comprising one or more nozzle openings formed at positions corresponding to a respective lower portion of a respective extension member and provided at a predetermined distance from said lower portion in the lower space.

According to a preferred embodiment of the present invention, the piezoelectric element has a length direction corresponding to the direction of the slits, has a width direction perpendicular to the length direction, and has a height direction perpendicular to the membrane and oriented from the lower space to the upper space. The piezoelectric element is provided with an orientation such that a deformation of a transversal piezoelectric effect occurs along the length direction of the piezoelectric element.

According to a preferred embodiment of the present invention, a longitudinal piezoelectric effect is an effect associated with a $d_{33}$-Effect of the piezoelectric element; and/or polarization of the piezoelectric element is parallel to the height direction.

According to a preferred embodiment of the present invention, the plate is a metal plate and the membrane is a metal membrane. The piezoelectric element is conductively bonded to the metal membrane. A bonding is provided essentially on the entire contact surface between the piezoelectric element and the metal membrane.

According to a preferred embodiment of the present invention, the nozzle openings have a diameter of 30 to 200 micrometers.

According to an aspect of the invention the predetermined distance, when no voltage is applied to the piezoelectric element, is between 5 and 450 micrometers.

According to a preferred embodiment of the present invention, a polyimide thin film membrane is provided between the metal plate and the extension member to act as a barrier to prevent contact of the piezoelectric element and any material present below. The polyimide thin film membrane is a Kapton membrane. Additionally or alternatively the polyimide thin film membrane has a thickness between 10 and 100 micrometers.

According to another aspect of the present invention, there is provided a print head comprising one or more of material ejection systems according to the present invention.

According to still another aspect of the present invention, there is provided a 3D printer comprising a print head according to the present invention. Preferably comprising one or more print heads according to the present invention.

According to the present invention, there is also provided a method for material ejection from a material ejection system according to present invention, wherein a voltage is applied to the first and second electrodes; wherein the longitudinal deformation of the piezoelectric element translates into a bending of the metal membrane and thereby causes a linear motion of the extension member.

DETAILED DESCRIPTION OF THE DRAWINGS

In the following, embodiments of the present invention will be described. It is noted that some aspects of every described embodiment may also be found in some other embodiments unless otherwise stated or obvious to the skilled person. However, for increased intelligibility, each aspect will only be described in detail when first mentioned and any repeated description of the same aspect will be omitted.

Figure 1:
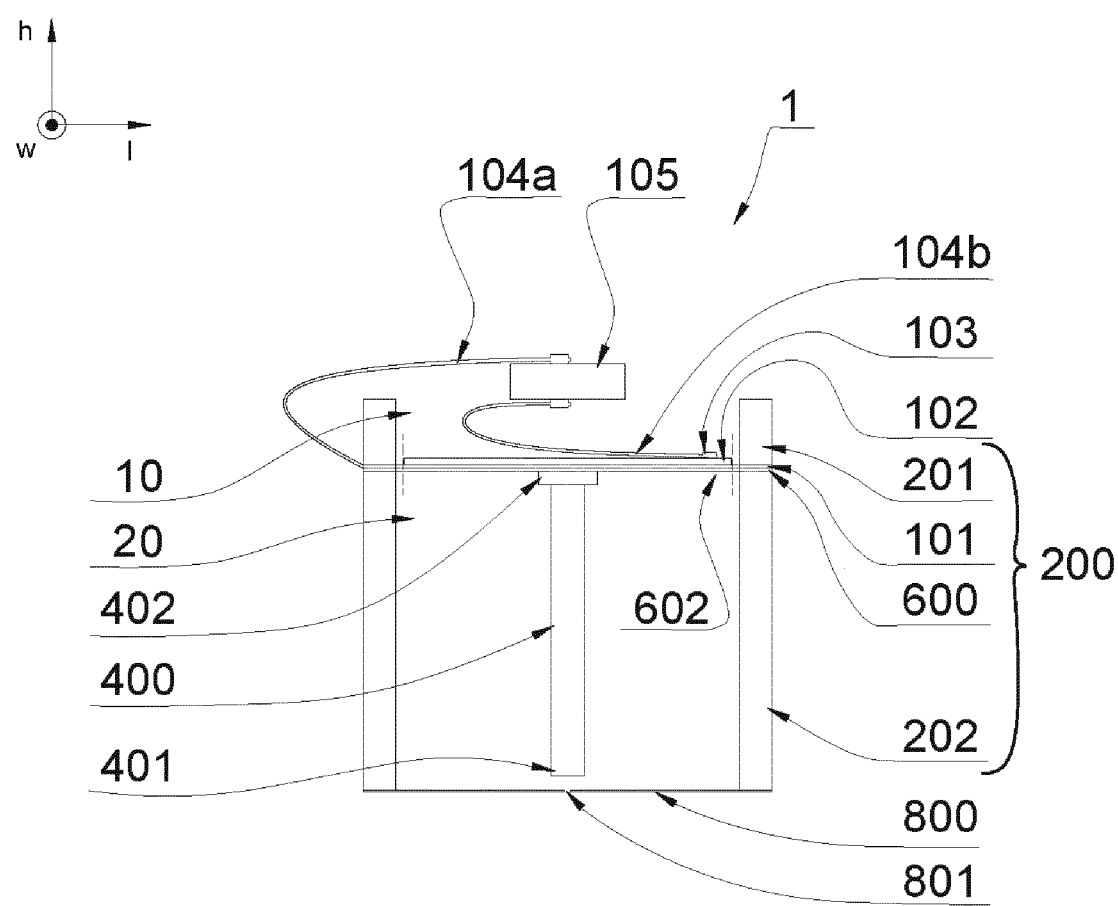
FIG. 1 shows a schematic view of an ejection unit according to an embodiment of the present invention with a piezoelectric element in a neutral position.

FIG. 1 shows a schematic view of a material ejection unit, MEU, 1 according to an embodiment of the present invention, with a piezoelectric element 102 in a neutral position. In detail, FIG. 1 shows a cross-section of a material ejection unit 1 according to an embodiment of the present invention.

Figure 5:
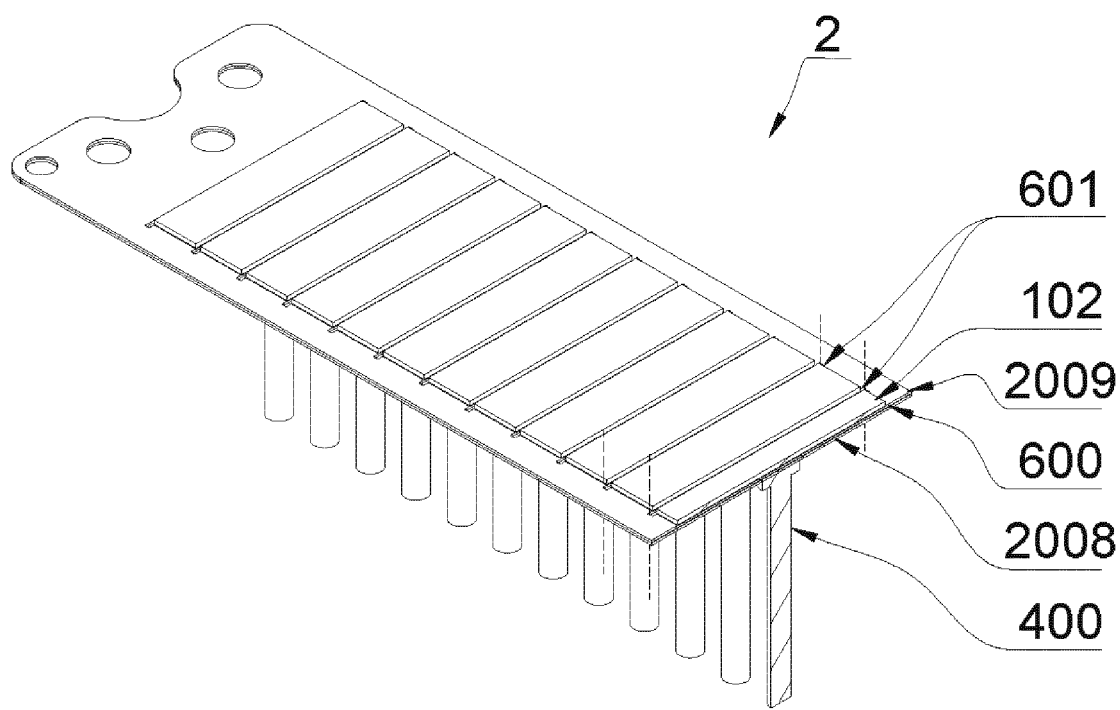
FIG. 5 shows a schematic perspective view of an actuator assembly according to an embodiment of the present invention.

In an embodiment of the present invention, a material ejection system, MES, 2 comprises one or more material ejection units 1 arranged parallel to each other, cf FIG. 5. In said embodiment, the one or more MEUs 1 are formed in a single common housing 200. In a preferred embodiment the housing 200 of the one or more MEU is a common housing and comprises a plurality of housing parts. The side walls 201 and 202 in FIG. 1 are housing parts of the housing 200.

In an embodiment of the present invention, a plate 600 is provided in the housing 200, which is preferably a metal plate 600. In a preferred embodiment, the plate 600 is provided essentially over an entire cross-section of the housing 200, thereby defining an upper space 10 and a lower space 20 in the housing 200. In the plate 600, parallel slits 601 are formed, preferably by laser cutting and/or electro forming. Between the slits 601 a metal membrane or tongue 602 is formed. In a preferred embodiment a plurality of membranes 602 are formed next to each-other sharing at least one slit 601 with a neighbouring membrane 602 of a neighbouring MEU 1.

In the embodiment of the present invention, above the membrane 602, i.e. in the upper space 10, a first electrode 101 is provided. In preferred embodiments the first electrode 101 is formed by a conductive layer, preferably in a sputtering process. Above of the first electrode 101 a piezoelectric element 102 is provided. Above of the piezoelectric element 102 a second electrode 103 is provided. In preferred embodiments the second electrode 103 is formed from a conductive material, preferably in a sputtering process.

In an embodiment of the present invention, the first electrode 101 is formed by the metal membrane. That is, the metal membrane serves as an electrode and the piezoelectric element is provided directly on the metal membrane.

The piezoelectric element 102 is conductively connected to the first and second electrodes 101 and 103. The first and second electrodes are conductively connected via electrical connectors 104a and 104b to a controller 105. In a preferred embodiment, on or more MEU of a MES are connected to a single common controller 105. The controller is configured to control a voltage applied to the piezoelectric element 102 via the first and second electrodes 101 and 103. In the preferred embodiment, the controller 105 is configured to control the voltage for each respective piezoelectric element 102 independently.

In a preferred embodiment, the piezoelectric element 102 is single stack piezoelectric element, more preferably a modified lead-zirconate-lead-titanate, PZT, PIC255, makeup.

Figure 2:
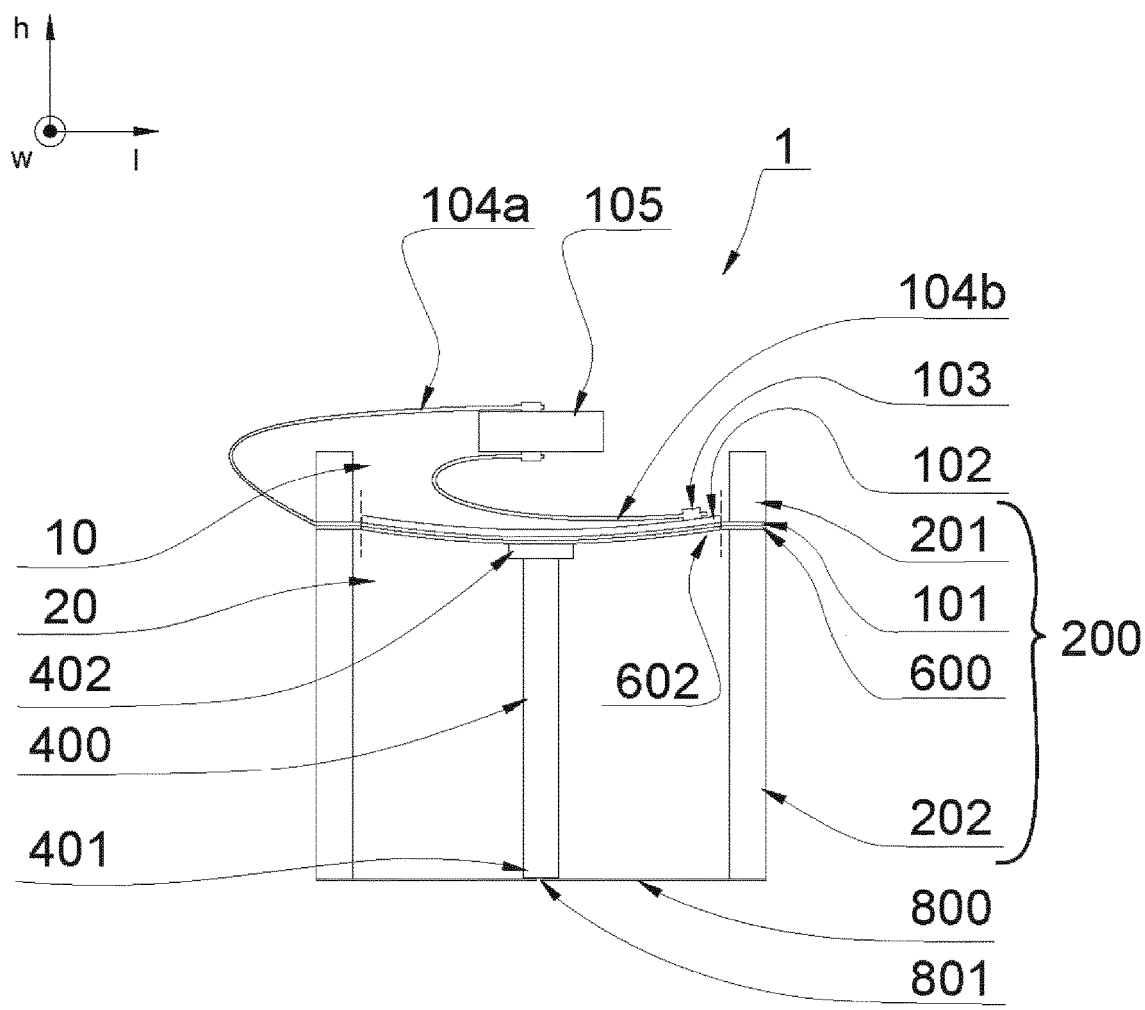
FIG. 2 shows a schematic view of an ejection unit according to an embodiment of the present invention with a piezoelectric element in a tension position.

Hereinafter the direction of the slits 601, i.e. the direction of the membrane 602, defines a length direction, l. Perpendicular to the length direction in a plane of the metal plate 600 a width, w, direction is defined, and perpendicular to said plane, from the lower to the upper space, a height direction, h, is defined. In FIG. 1 and FIG. 2 the respective directions are indicated by the arrows in the coordinate-system in the top left.

According to the present invention, the piezoelectric element 102 is provided in a $d_{33}$ configuration. That is, the polarization direction of the piezoelectric element is parallel to the electric field generated between the first and second electrodes 101 and 103, when a voltage is applied.

According to the present invention, the piezoelectric element is furthermore provided in an orientation such that a transversal piezoelectric effect is observed in the length direction when a voltage is applied in the height direction.

In other words, the piezoelectric element 102 extends in the length and height direction, when a voltage is applied to the first and second electrodes 101 and 103 and the height deformation is more efficient than the length deformation.

In a preferred embodiment, the electric field in the piezoelectric element aligned in a $d_{33}$ mode configuration has a higher net efficiency compared to an orthogonal $d_{31}$ configured electric field.

In an embodiment of the present invention, the piezoelectric element further experiences an orthogonal $d_{31}$ deformation at roughly ⅓ the deformation of the primary $d_{33}$ strain.

In a preferred embodiment, the metal plate 600 is made of steel. In a preferred embodiment, an electrically conductive thin-film epoxy adhesive is used for bonding the piezoelectric element 102 and the metal membrane 602 formed in the metal plate 600 and/or the first electrode, preferably formed over an entire contact surface of the piezoelectric element 102 and the metal membrane 602. This allows for electrical conductance between the bonded surfaces of the piezoelectric element and the metal membrane 602. In a preferred embodiment the metal membrane 602 is used as first electrode 101.

In an embodiment of the present invention, an extension member 400 is provided underneath the metal membrane 602, i.e. in the lower space 20 of the housing 200. In a preferred embodiment, the extension member is a cylindrical extension member 400. In a preferred embodiment, the extension member 400 is provided at a center position of the metal membrane 602.

In an embodiment of the present invention, an upper end portion 402 of the extension member 400 is fixed to the metal membrane 602 by means of a bonding adhesive with a suitable flexibility.

In an embodiment of the present invention, a nozzle plate 800 (see FIG. 3) is provided at a bottom portion of the housing defining a lower end, or bottom, of the lower space 20. In the nozzle plate 800 one or more nozzle openings 801, are formed. In a preferred embodiment at least one of the nozzle openings 801 corresponds to the position of an extension member of the one or more MEU 1 in one MES 2.

In a preferred embodiment, the nozzle openings 801 have a diameter of 30 to 200 micrometers, more preferably 50 to 110, most preferably 65 to 85 micrometer. In a preferred embodiment the nozzle plate is a formed of metal or a polymer and the nozzle openings 801 are preferably formed by etching or laser cutting.

In an embodiment of the present invention, a lower end portion 401 of the extension member 400 is positioned at a predetermined distance to a nozzle plate 800, when no voltage is applied to the piezoelectric element. The predetermined distance is preferably between 5 to 450 micrometers, more preferably 70 to 250, most preferably 190 to 225 micrometers.

FIG. 2 shows a schematic view of an ejection unit according to an embodiment of the present invention, with a piezoelectric element in an extended position, i.e. a voltage is applied. As discussed above, when a voltage is applied to piezoelectric element 102 via the first and second electrodes 101 and 103, an electric field is generated between the two electrodes. According to the present invention, the electric field is parallel to the height direction and generates a primary $d_{33}$ effect in the height direction and a secondary $d_{31}$ effect in the length and/or width direction.

According to the present invention, the piezoelectric element 102 is fixed to the metal membrane 602. Therefore, since the piezoelectric element 102 can not freely expand in the length direction the $d_{31}$ effect translates into a bending of the piezoelectric element 102 and the metal membrane 602.

In an embodiment of the present invention, this bending is further amplified by the $d_{33}$ effect resulting in a further height expansion of the piezoelectric element 102, which also contributes to the bending.

In other words, the $d_{31}$ effect and/or $d_{33}$ effect causes a bending of the piezoelectric element and the metal membrane 602. According to the present invention, the bending of the metal membrane 602 is translated into a translation of the extension member along the height direction. This bending is also referred to hereinafter as a quasi-bi-morph deformation.

That is, the lateral contraction and expansion of the piezoelectric element, against the metal membrane 602 causes an orthogonal movement in relation to the connecting surfaces of the piezoelectric element and the metal membrane 602, resulting in an amplification of the piezoelectric extension with the highest amplitude of linear movement orthogonal to the metal membrane 602 in the center of said metal membrane 602.

It is an aspect of the present invention that the quasi-bi-morph deformation has a higher amplitude than the $d_{31}$ effect and/or the $d_{33}$ alone and therefore the piezoelectric deformation is amplified. This allows for an improved translation range of the extension member, when using the same piezoelectric element or when using of a smaller piezoelectric element that achieves the same translation. That is, the quasi-bi-morph deformation is more cost effective compared to a conventional piezoelectric actuator.

In an embodiment of the present invention, a material is provided in the lower space 20 of the housing 200. The material is provided such that the lower end portion 401 of the extension member 400 ends in the material. In preferred embodiments the material is provided in a liquid phase.

According to the present invention, the motion of the lower end portion 401 in the material causes an ejection of a portion of the material through the nozzle opening 801. In other words, the column of material situated above the, preferably circular, nozzle opening, will experience a downward impulse. This allows for a controlled ejection of material through the nozzle opening.

Different liquid material properties such as viscosity, surface tension and other rheological factors create certain windows for parametric control of the actuation that allow for ideal drop release.

In a preferred embodiment, the MEUs 1 of a MES 2 can be independently driven by the controller 105 by independently applying a voltage to each of the piezoelectric elements of each MEU.

Figure 3:
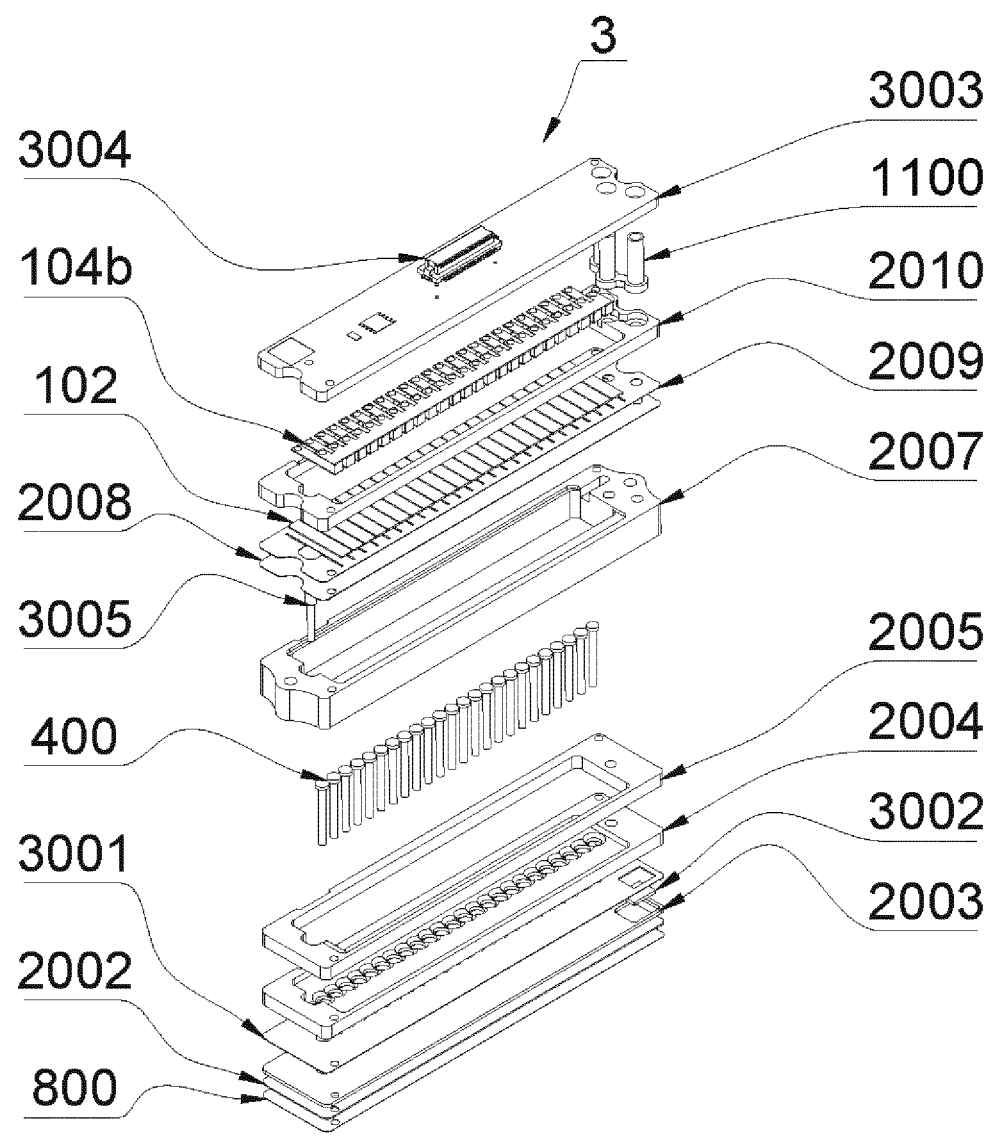
FIG. 3 shows a schematic exploded view of a print head according to an embodiment of the present invention.

FIG. 3 shows a schematic exploded view of a print head 3 according to an embodiment of the present invention. According to the present invention, one or more MEUs 1 form a MES 2. Furthermore, according the present invention, a print head 3 for a 3D printer comprises a MES 2 and further components.

In an embodiment of the present invention as shown in FIG. 3, the print head 3 further comprises a material supply system 1100 for supplying the material into the lower space 20 via a first connector 1101. The print head 3 further comprises a first vacuum connector 1102 for removing or inserting gas and material from the upper space 10 and/or a second vacuum connector 1103 for removing gas or inserting and material from the lower space 20.

The print head 3 has a layered structure which is described hereinbelow. Although the use of different layers has a number of advantages in terms of manufacturing, the present invention is not limited thereto. In particular in certain embodiments some layers may be omitted and/or the function of any number of layers can be combined or divided into another layer.

The print head 3 further comprises a spacer plate 2002 provided above the nozzle plate 800. The spacer plate 2002 facilitates precise relative positioning of respective the respective nozzle openings relative to the respective lower ends 401 of the respective extension member 400.

The print head 3 further comprises a reference plate 2003 provided above the spacer plate 2002. The spacer plate 2002 is fixed to the reference plate 2003 to facilitate precise positioning of the nozzle plate 800 relative to the respective lower ends 401 of the respective extension members 400.

The print head 3 further comprises a printed circuit board, PCB, layer 3001 provided above the reference plate 2003. The PCB layer 3001 comprises at least one heating element and preferably at least one temperature sensing element 3002. The PCB layer 3001 is configured to heat the material and/or to control a temperature of the material.

The print head 3 further comprises a material channel plate 2004 provided above the PCB layer 3001. In the material channel plate 2004 one or more material reservoirs are formed, each corresponding to a MEU 1. The at least one heating element of the PCB layer 3001 is in thermal contact with the material channel plate for heating the material in the respective one or more material reservoirs. The at least one heating element and the a temperature sensing element 3002 are configured for a closed loop temperature control of the material present in the material reservoirs formed above the nozzle plate 800.

The print head 3 further comprises a thermal insulation wall element 2005 provided above the material channel plate 2004. The thermal insulation wall element 2005 is configured to thermally insulate the heated material cannel plate 2004 from the elements located thereabove.

The print head 3 further comprises a material inflow plate 2007 provided on top of the material screening plate 2006. The material inflow plate is configured to guide the material supplied through the material supply system along at least one wall of the housing into the material reservoir.

The print head 3 further comprises a polyimide thin film membrane 2008, provided above the material inflow plate 2007. The polyimide thin film membrane 2008 is configured to fix the respective extension members 400 to the respective metal membranes 602 of the MEUs 1. In preferred embodiments the polyimide thin film membrane is a Kapton membrane. In preferred embodiments the polyimide thin film membrane has a thickness between 10 and 100, more preferably between 20 and 80, most preferably 25 and 50 micrometers.

In an embodiment of the present invention, the polyimide thin film membrane acts as a barrier to prevent contact of piezoelectric element and any material present in the material reservoir below.

The print head 3 further comprises a piezoelectric element holding plate 2009, provided above the polyimide thin film membrane 2008. The piezoelectric element holding plate 2009 comprises the metal plate 600 of the MES 2. In a preferred embodiment the respective piezoelectric elements 102 of the MEUs 1 are bonded above the upper surface of the piezoelectric element holding plate 2009. The respective extension members 400 of the MEUs are fixed below the lower surface of the piezoelectric element holding plate 2009 in order to facilitate an impulse transfer of the, quasi-bi-morph, linear motion downwards into the material present in the material reservoirs through a material-gas or a material-vacuum interface.

The print head 3 further comprises a top spacer plate 2010 provided above the piezoelectric element holding plate 2009.

The print head 3 further comprises PCB-top-layer 3003 provided above the top spacer plate 2010. The PCB-top-layer 3003 comprises the controller 105 of the MES 2. The respective piezoelectric elements 102 of the MEUs 1 are connected to the PCB-top-layer 3003 via electrical connectors 104b.

The print head 3 further comprises a material level sensing unit 3005 preferably provided on the PCB-top-layer 3003 and extending through the piezoelectric element holding plate 2009 into the lower space 20 into the reservoir. This allows for maintaining adequate amounts of material to be transferred to the print head 3.

In an embodiment of the present invention, the print head 3 further comprises an electrical connector unit 3004 provided on the PCB-top-layer 3003 and configured to connect the PCB-top-layer 3003 to control electronic of the 3D printer.

Figure 4:
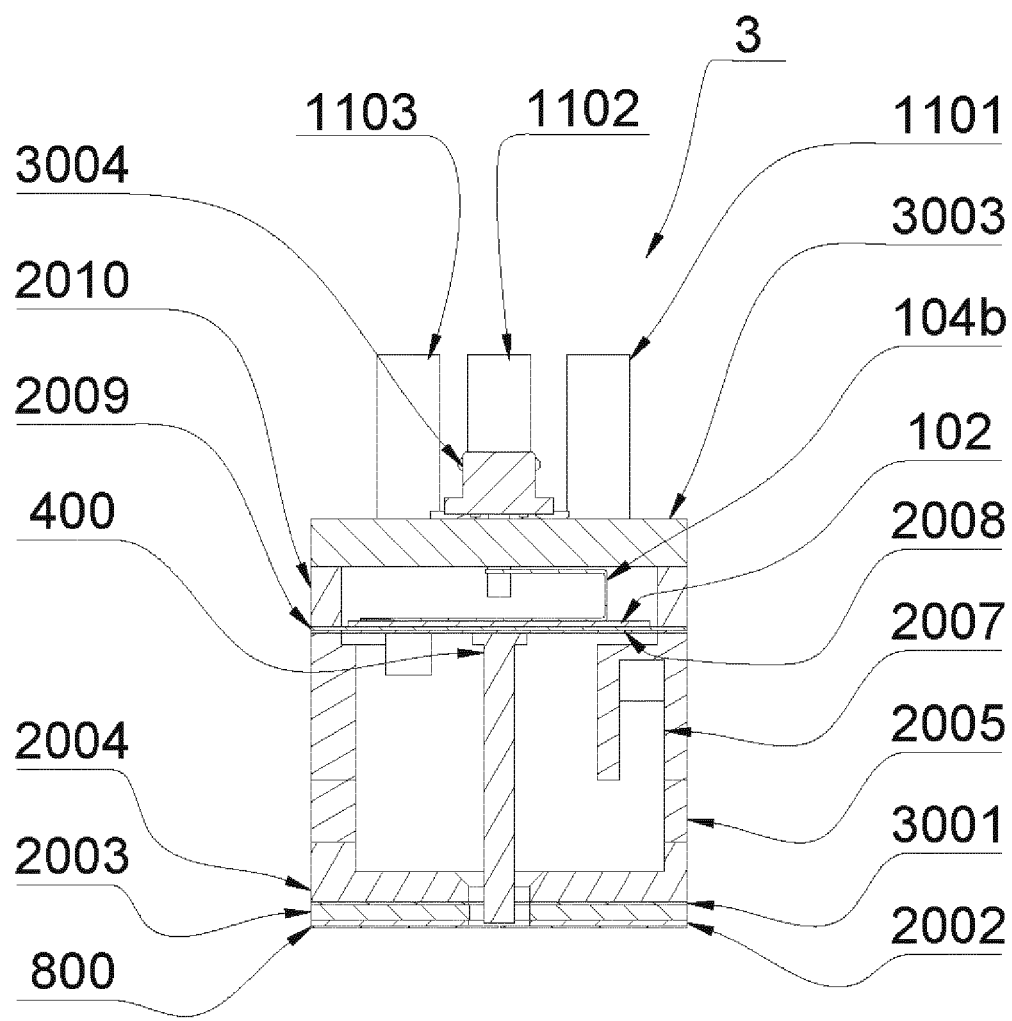
FIG. 4 shows a schematic cross-section view of an assembled print head according to an embodiment of the present invention.

FIG. 4 shows a schematic cross-section view of a assembled print head according to the embodiment of FIG. 3. In embodiments of the present invention, when assembled, the print head 3 comprises the housing 200 of the MES 2 and one or more MEUs 1 of the MES 2.

FIG. 5 shows a schematic perspective view of an actuator assembly according to the embodiment of FIG. 3. In detail, the piezoelectric element holding plate 2009 is shown in isolation of the rest of the print head 3.

Underneath the piezoelectric element holding plate 2009 the polyamide thin film 2008 is provided, preferably covering essentially the full bottom surface of the piezoelectric holding plate 2009. Underneath the polyamide thin film 2008 the plurality extension members 400, each of a MEU 1, are provided. In the piezoelectric holding plate a plurality of parallel slits 601 are forming the plurality of membranes 602, each of a MEU 1. On the membranes 602 the plurality of piezoelectric elements 102, each of a MEU 1, is provided.

In an embodiment of the present invention, the extension member 400 is configured to transfer the high amplitude actuation into the temperature controlled material, while distancing the piezoelectric element from said material and any direct thermal influence no the piezoelectric element, thereby reducing thermal strain and wear in the actuator system.

In an embodiment of the present invention, the, preferably linear, arrangement of nozzle openings is altered in different configurations to improve nozzle density within one material reservoir. The arrangement depends on the maximum density of piezoelectric element being individually addressable on the piezoelectric element holding plate 2009. The shapes of said piezoelectric elements could is preferably one or more of a circular, a octagonal, a hexagonal, a tetragonal, triangular shapes and/or truncated variations of said shapes.

What has been described and illustrated hereinabove are embodiments of the invention along with some of variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

The invention claimed is:

1. A material ejection system comprising:
   a housing;
   a plate provided in the housing and dividing the housing in an upper space and a lower space, wherein the lower space is configured to hold a material for ejection, and wherein at least one heating element is provided to heat the material and/or to control a temperature of the material;
   a controller unit;
   one or more material ejection units each comprising:
      a membrane formed by two essentially parallel slits in the plate,
      a first electrode provided above the membrane in the upper space,
      a piezoelectric element provided on the first electrode,
      a second electrode provided on the piezoelectric element, wherein the first and second electrodes are each electrically connected to the controller unit for providing a voltage to the piezoelectric element, and
      an extension member provided underneath the membrane extending into the lower space; and
   the material ejection system further comprising:
      a nozzle plate provided at a bottom end of the housing and comprising one or more nozzle openings formed at positions corresponding to a respective lower portion of a respective extension member and provided at a predetermined distance from said lower portion in the lower space,
   wherein a lateral contraction and expansion of the piezoelectric element, against the membrane, causes an orthogonal movement in relation to connecting surfaces of the piezoelectric element and the membrane, and
   wherein the extension member is configured to transfer the movement of the membrane into the material, and motion of the lower end portion in the material causes an ejection of a portion of the material through the nozzle opening by a downward impulse.

2. The material ejection system according to claim 1, wherein the piezoelectric element has a length direction corresponding to the direction of the slits, has a width direction perpendicular to the length direction, and has a height direction perpendicular to the membrane and oriented from the lower space to the upper space; and
wherein the piezoelectric element is provided with an orientation such that a deformation of a transversal piezoelectric effect occurs along the length direction of the piezoelectric element.

3. The material ejection system according to claim 1, wherein a longitudinal piezoelectric effect is an effect associated with a $d_{33}$-Effect of the piezoelectric element; and/or polarization of the piezoelectric element is parallel to the height direction.

4. The material ejection system according to claim 1, wherein the plate is a metal plate and the membrane is a metal membrane,
wherein the piezoelectric element is conductively bonded to the metal membrane; and
wherein a bonding is provided essentially on the entire contact surface between the piezoelectric element and the metal membrane.

5. The material ejection system according to claim 1, wherein the nozzle openings have a diameter of 30 to 200 micrometers.

6. The material ejection system according to claim 1, wherein the predetermined distance, when no voltage is applied to the piezoelectric element, is between 5 to 450 micrometers.

7. The material ejection system according to claim 1, wherein a polyimide thin film membrane is provided between the plate and the extension member to act as a barrier to prevent contact of the piezoelectric element and any material present below;
wherein the polyimide thin film membrane is a Kapton membrane; and/or
wherein the polyimide thin film membrane has a thickness between 10 and 100 micrometers.

8. A method for material ejection from a material ejection system according to claim 1, wherein a voltage is applied to the first and second electrodes; wherein the longitudinal deformation of the piezoelectric element translates into a bending of the metal membrane and thereby causes a linear motion of the extension member.

9. A print head comprising one or more of material ejection systems, wherein at least one material ejection system of the one or more material ejection systems comprises:
a housing;
a plate provided in the housing and dividing the housing in an upper space and a lower space, wherein the lower space is configured to hold a material for ejection, and wherein at least one heating element is provided to heat the material and/or to control a temperature of the material;
a controller unit;
one or more material ejection units each comprising:
a membrane formed by two essentially parallel slits in the plate,
a first electrode provided above the membrane in the upper space,
a piezoelectric element provided on the first electrode,
a second electrode provided on the piezoelectric element, wherein the first and second electrodes are each electrically connected to the controller unit for providing a voltage to the piezoelectric element, and
an extension member provided underneath the membrane extending into the lower space; and
the material ejection system further comprising:
a nozzle plate provided at a bottom end of the housing and comprising one or more nozzle openings formed at positions corresponding to a respective lower portion of a respective extension member and provided at a predetermined distance from said lower portion in the lower space,
wherein a lateral contraction and expansion of the piezoelectric element, against the membrane, causes an orthogonal movement in relation to connecting surfaces of the piezoelectric element and the membrane, and
wherein the extension member is configured to transfer the movement of the membrane into the material, and motion of the lower end portion in the material causes an ejection of a portion of the material through the nozzle opening by a downward impulse.

10. The print head according to claim 9, wherein the piezoelectric element has a length direction corresponding to the direction of the slits, has a width direction perpendicular to the length direction, and has a height direction perpendicular to the membrane and oriented from the lower space to the upper space; and
wherein the piezoelectric element is provided with an orientation such that a deformation of a transversal piezoelectric effect occurs along the length direction of the piezoelectric element.

11. The print head according to claim 9, wherein a longitudinal piezoelectric effect is an effect associated with a $d_{33}$-Effect of the piezoelectric element; and/or polarization of the piezoelectric element is parallel to the height direction.

12. The print head according to claim 9, wherein the plate is a metal plate and the membrane is a metal membrane,
wherein the piezoelectric element is conductively bonded to the metal membrane; and
wherein a bonding is provided essentially on the entire contact surface between the piezoelectric element and the metal membrane.

13. The print head according to claim 9, wherein the predetermined distance, when no voltage is applied to the piezoelectric element, is between 5 to 450 micrometers.

14. The print head according to claim 9, wherein a polyimide thin film membrane is provided between the plate and the extension member to act as a barrier to prevent contact of the piezoelectric element and any material present below;
wherein the polyimide thin film membrane is a Kapton membrane; and/or
wherein the polyimide thin film membrane has a thickness between 10 and 100 micrometers.

15. A 3D printer comprising one or more print heads, wherein at least one print head of the one or more print heads comprises one or more material ejection systems, and wherein at least one material ejection system of the one or more material ejection systems comprises:
a housing;
a plate provided in the housing and dividing the housing in an upper space and a lower space, wherein the lower space is configured to hold a material for ejection, and wherein at least one heating element is provided to heat the material and/or to control a temperature of the material;
a controller unit;

one or more material ejection units each comprising:
- a membrane formed by two essentially parallel slits in the plate,
- a first electrode provided above the membrane in the upper space,
- a piezoelectric element provided on the first electrode,
- a second electrode provided on the piezoelectric element, wherein the first and second electrodes are each electrically connected to the controller unit for providing a voltage to the piezoelectric element, and
- an extension member provided underneath the membrane extending into the lower space; and the material ejection system further comprising:
- a nozzle plate provided at a bottom end of the housing and comprising one or more nozzle openings formed at positions corresponding to a respective lower portion of a respective extension member and provided at a predetermined distance from said lower portion in the lower space,
- wherein a lateral contraction and expansion of the piezoelectric element, against the membrane, causes an orthogonal movement in relation to connecting surfaces of the piezoelectric element and the membrane, and
- wherein the extension member is configured to transfer the movement of the membrane into the material, and motion of the lower end portion in the material causes an ejection of a portion of the material through the nozzle opening by a downward impulse.

16. The 3D printer according to claim 15, wherein the piezoelectric element has a length direction corresponding to the direction of the slits, has a width direction perpendicular to the length direction, and has a height direction perpendicular to the membrane and oriented from the lower space to the upper space; and
wherein the piezoelectric element is provided with an orientation such that a deformation of a transversal piezoelectric effect occurs along the length direction of the piezoelectric element.

17. The 3D printer according to claim 15, wherein a longitudinal piezoelectric effect is an effect associated with a $d_{33}$-Effect of the piezoelectric element; and/or polarization of the piezoelectric element is parallel to the height direction.

18. The 3D printer according to claim 15, wherein the plate is a metal plate and the membrane is a metal membrane,
wherein the piezoelectric element is conductively bonded to the metal membrane; and
wherein a bonding is provided essentially on the entire contact surface between the piezoelectric element and the metal membrane.

19. The 3D printer according to claim 15, wherein the predetermined distance, when no voltage is applied to the piezoelectric element, is between 5 to 450 micrometers.

20. The 3D printer according to claim 15, wherein a polyimide thin film membrane is provided between the plate and the extension member to act as a barrier to prevent contact of the piezoelectric element and any material present below;
wherein the polyimide thin film membrane is a Kapton membrane; and/or
wherein the polyimide thin film membrane has a thickness between 10 and 100 micrometers.

* * * * *